(12) United States Patent
Kobayashi et al.

(10) Patent No.: US 6,646,078 B2
(45) Date of Patent: Nov. 11, 2003

(54) METHOD OF PRODUCING PARAFFIN WAX FOR AQUEOUS DISPERSION POLYMERIZATION OF TETRAFLUOROETHYLENE AND METHOD OF PRODUCING A POLYTETRAFLUOROETHYLENE USING THE SAME

(75) Inventors: Shigeki Kobayashi, Ichihara (JP); Jun Hoshikawa, Ichihara (JP); Kazuo Kato, Ichihara (JP); Hiroki Kamiya, Ichihara (JP); Hiroyuki Hirai, Ichihara (JP)

(73) Assignees: Asahi Glass Company, Limited, Tokyo (JP); Asahi Glass Fluoropolymers Co., Ltd., Ichihara (JP)

( * ) Notice: Subject to any disclaimer, the term of this patent is extended or adjusted under 35 U.S.C. 154(b) by 0 days.

(21) Appl. No.: 10/022,426

(22) Filed: Dec. 20, 2001

(65) Prior Publication Data

US 2002/0082343 A1 Jun. 27, 2002

(30) Foreign Application Priority Data

Dec. 21, 2000 (JP) ........................................ 2000-388855

(51) Int. Cl.$^7$ ................................................. C08F 2/00
(52) U.S. Cl. ...................... 526/207; 526/250; 526/255; 524/700
(58) Field of Search .......................... 524/700; 526/207, 526/250, 255

(56) References Cited

U.S. PATENT DOCUMENTS

| | | | | |
|---|---|---|---|---|
| 4,076,929 A | * | 2/1978 | Dohany | 526/255 |
| 5,176,958 A | * | 1/1993 | Shimizu et al. | 428/402 |
| 5,688,884 A | * | 11/1997 | Baker et al. | 526/225 |
| 5,731,394 A | * | 3/1998 | Treat et al. | 526/247 |
| 6,136,933 A | * | 10/2000 | Jones | 526/255 |

FOREIGN PATENT DOCUMENTS

EP   1 006 129   6/2000

\* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A method of producing a paraffin wax for aqueous dispersion polymerization of TFE which allows high speed aqueous dispersion polymerization of TFE with excellent polymerization behavior such as excellent dispersion stability and consistent production of PTFE having excellent physical properties, and a method of producing PTFE using the paraffin wax. Aqueous dispersion polymerization of tetrafluoroethylene (hereinafter referred to as TFE) is conducted in the presence of a paraffin wax, a polymerization initiator and an emulsifier at least once and then the paraffin wax is recovered. The recovered paraffin wax is used for aqueous dispersion polymerization of TFE in the presence of a polymerization initiator and an emulsifier.

18 Claims, No Drawings

METHOD OF PRODUCING PARAFFIN WAX FOR AQUEOUS DISPERSION POLYMERIZATION OF TETRAFLUOROETHYLENE AND METHOD OF PRODUCING A POLYTETRAFLUOROETHYLENE USING THE SAME

The present invention relates to a method of producing a paraffin wax used in aqueous dispersion polymerization of tetrafluoroethylene and a method of producing a polytetrafluoroethylene using the resulting paraffin wax. The resulting polytetrafluoroethylene is used for thread seal tape, a binder for fuel cells and so on.

Polytetrafluoroethylene (hereinafter referred to as PTFE) has been obtained by polymerizing tetrafluoroethylene (hereinafter referred to as TFE) alone or, if necessary, with comonomers and is used for various products.

PTFE is obtainable by aqueous dispersion polymerization and available in the form of a dispersion of polymer particles or in the form of fine powder after coagulation and drying.

PTFE dispersions are used for glass cloth impregnation to make canvas. PTFE fine powder is used as a raw material for wire coatings, tubes, thread seal tape, clothing and stretched porous films such as filters.

It is known that in aqueous dispersion polymerization of TFE, formation of a small amount of coagulum makes coagulation of the dispersion proceed acceleratingly and finally the dispersion coagulates entirely. Therefore, to prevent entire coagulation by removing a small amount of coagulum from the micells where TFE is polymerizing, a paraffin wax is usually added to the polymerization system as a dispersion stabilizer.

However, when used in aqueous dispersion polymerization of TFE, usual commercially available paraffin waxes show different influences on the polymerization behavior and the physical properties of the resulting PTFE depending on the grade or the production lot used, and this is a big problem for consistent production of PTFE by aqueous dispersion polymerization. As the influences on the polymerization behavior, reduction of the polymerization rate and hindrance of the polymerization may be mentioned. As the influences on the physical properties of the resulting PTFE, it may be mentioned that the primary particle diameters and the paste extrusion pressure are off the required standard range for molding.

Further, paraffin waxes are usually disposed as waste after they are used. It is used in maximum amounts of at least 10% in relation to water, and reduction of waste paraffin waxes is one of the major issues.

The object of the present invention is to provide a method of producing a paraffin wax for aqueous dispersion polymerization of TFE which allows high speed aqueous dispersion polymerization of TFE with excellent polymerization behavior such as excellent dispersion stability and consistent production of PTFE having excellent physical properties, and a method of producing PTFE using the resulting paraffin wax.

The present inventors have conducted extensive research on aqueous dispersion polymerization of TFE and found that the influences of the quality of the paraffin wax on the polymerization behavior of TFE and the physical properties of the resulting PTFE can be reduced when the paraffin wax is used in ordinary aqueous dispersion polymerization of TFE in the presence of a polymerization initiator and an emulsifier at least once and then recovered and used. The present invention has been accomplished on the basis of this discovery.

Namely, the present invention provides a method of producing a paraffin wax for aqueous dispersion polymerization of TFE, which comprises conducting aqueous dispersion polymerization of tetrafluoroethylene in the presence of a paraffin wax, a polymerization initiator and an emulsifier at least once and then recovering the paraffin wax.

The present invention also provides the above-mentioned method of producing a paraffin wax wherein paraffin wax is washed with water after it is recovered.

The present invention provides the above-mentioned method of producing a paraffin wax wherein the washing with water is carried by stirring the recovered paraffin wax in from 10 to 80 parts of water in relation to 100 parts of the paraffin wax at a temperature of from the melting point of the recovered paraffin wax to 95° C.

The present invention further provides a method of producing PTFE, conducting aqueous dispersion polymerization of tetrafluoroethylene by using the recovered paraffin produced by any of the above-mentioned methods in the presence of a polymerization initiator and an emulsifier.

The paraffin wax used in the method of producing a paraffin wax of the present invention is not particularly restricted and may be a commercially available paraffin wax.

When used in aqueous dispersion polymerization of TFE, commercially available paraffin waxes show different influences on the polymerization behavior and the physical properties of the resulting PTFE depending on the grade or the production lot used, and this is a big hindrance to consistent production of PTFE by aqueous dispersion polymerization.

A paraffin wax having a melting point from 40 to 65° C., particularly from 50 to 65° C., is preferable. In the aqueous dispersion polymerization, the paraffin wax is preferably used in an amount of from 0.1 to 12% (by mass, the same applies hereinafter), particularly from 0.1 to 8%, based on the mass of the water.

As the paraffin wax used in the method of producing a paraffin wax of the present invention, a fresh paraffin wax may be used alone or in combination with a recovered paraffin wax already produced by the method of producing a paraffin wax of the present invention. In the case of combination use, the ratio of a fresh paraffin wax/a recovered paraffin wax is preferably at most 80/20, particularly at most 40/60. Use of a large amount of a recovered paraffin wax and a smaller ratio of the fresh paraffin wax reduces the influences of the fresh paraffin wax on the polymerization behavior of the aqueous dispersion polymerization of TFE and the physical properties of the resulting PTFE. Therefore, even if a fresh paraffin wax is used in combination, the polymerization rate and the physical properties can be brought within given ranges. Further, the method of producing a paraffin wax of the present invention may be applied to an ordinary PTFE production process to more effectively produce a recovered paraffin wax.

The aqueous dispersion polymerization of TFE in the method of producing a paraffin wax of the present invention is conducted in the presence of a paraffin wax, a polymerization initiator and an emulsifier.

The polymerization of TFE in the method of producing a paraffin wax of the present invention may be homopolymerization of TFE or copolymerization of TFE with comonomers such as fluorine-containing monomers other than TFE. As comonomers, fluorine-containing monomers such as hexafluoropropylene, perfluorobutene-1, perfluorohexene-1, perfluorononene-1, perfluoro(methyl vinyl ether), perfluoro(ethyl vinyl ether), perfluoro(propyl vinyl ether), perfluoro(heptyl vinyl ether), (perfluoromethyl)

ethylene, (perfluorobutyl)ethylene and chlorotrifluoroethylene may be mentioned. These fluorine-containing monomers may be used alone or in combination of at least two of them. The ratio of a comonomer to be copolymerized is usually at most 1%, preferably at most 0.5%.

The polymerization temperature is preferably within the range of from 5 to 120° C., particularly within the range of from 60 to 100° C. The polymerization pressure is selected appropriately and preferably within the range of from 0.5 to 4.0 MPa, particularly within the range of from 1.0 to 2.5 MPa.

As the polymerization initiator, a water-soluble radical polymerization initiator or a water-soluble redox type polymerization initiator is preferred. Preferred water-soluble radical polymerization initiators are persulfates such as ammonium persulfate and potassium persulfate and water-soluble organic peroxides such as disuccinic acid peroxide, diglutaric acid peroxides and tert-butyl hydroperoxide. They may be used alone or in combination or at least two. The amount of the polymerization initiator is preferably from 5 to 200 ppm, particularly from 15 to 120 ppm, based on the mass of the water. If the amount of the polymerization initiator is too small, the recovered paraffin wax can have little effect of suppressing the undesirable influences on the polymerization.

As the emulsifier, an anionic surfactant which is unlikely to undergo chain transfer, particularly a fluorocarbon anionic surfactant, is preferred. Specific examples include $XC_nF_{2n}COOM$ (wherein X is a hydrogen atom, a chlorine atom, a fluorine atom or $(CF_3)_2CF$, M is a hydrogen atom, $NH_4$ or an alkali metal, and n is an integer of from 6 to 12), $C_mF_{2m+1}O(CF(CF_3)CF_2O)_pCF(CF_3)COOM$ (wherein M is a hydrogen atom, $NH_4$ or an alkali metal, m is an integer of from 1 to 12, and p is an integer of from 0 to 5), $C_nF_{2n+1}SO_3M$ and $C_nF_{2n+1}CH_2CH_2SO_3M$. More preferred are perfluorocarbon anionic surfactants such as $C_7F_{15}COONH_4$, $C_8F_{17}COONH_4$, $C_9F_{19}COONH_4$, $C_{10}F_{21}COONH_4$, $C_7F_{15}COONa$, $C_8F_{17}COONa$, $C_9F_{19}COONa$, $C_7F_{15}COOK$, $C_8F_{17}COOK$, $C_9F_{19}COOK$ and $C_3F_7O(CF(CF_3)CF_2O)_2CF(CF_3)COONH_4$. These may be used alone or in combination of at least two. The amount of the emulsifier is preferably within the range of from 250 to 5000 ppm, based on the mass of the water used. This amount range allows improvement in the stability of the aqueous dispersion and increase in the breaking strength of molded articles made of the resulting PTFE. It is also preferred to add an extra amount of the emulsifier to further improve the stability of the aqueous dispersion.

The aqueous dispersion polymerization is usually so conducted as to give a PTFE aqueous dispersion with a solid content of from 20 to 45%, preferably at least 25% in the present invention. If the polymerization is terminated at a low solid content, the recovered paraffin wax may have little effect of suppressing the undesirable influences on the polymerization. It is not preferable that the solid content is too high because the a large amount of coagulum is produced.

In the present invention, from the PTFE aqueous dispersion obtained by aqueous dispersion polymerization of TFE, the paraffin wax is recovered.

The recovery of the paraffin wax is accomplished by separating the molten paraffin wax from the PTFE aqueous dispersion by decantation or by cooling the aqueous dispersion and then separating the solidified paraffin wax.

The recovered paraffin wax may be used for aqueous dispersion polymerization of TFE directly after removal of PTFE coagulum contained therein but preferably after washed with water. The PTFE coagulum in the recovered paraffin wax can readily be removed from the paraffin wax in a molten state by decantation or filtration. The washing with water is preferably carried out by mixing the recovered paraffin wax and water. The washing with water is preferably carried out by stirring in a vessel equipped with a jacket.

The recovered paraffin wax is preferably washed with from 10 to 80 parts of water in relation to 100 parts (by weight, the same applies hereinafter) of the paraffin wax, particularly with from 30 to 60 parts of water in view of the washing efficiency and productivity. The washing temperature is preferably from the melting point of the recovered paraffin wax to 95° C., particularly from 70 to 85° C. If the washing temperature is higher than 95° C., the paraffin wax can oxidatively deteriorate. An oxidatively deteriorated paraffin wax, if used in aqueous dispersion polymerization of TFE, has harmful effects such as a slowdown of the polymerization rate and complete hindrance of the progress of the polymerization and moreover can deteriorate the physical properties of the resulting PTFE. The washing is preferably carried out for from 30 minutes to 4 hours, particularly from 1 to 3 hours, after the temperature reaches the predetermined level. The paraffin wax recovered in a liquid state may be used directly for aqueous dispersion polymerization of TFE after recovery or after recovery and washing with water, but preferably after solidification.

The production of PTFE according to the present invention is preferably carried out under the same conditions as the method of producing a paraffin wax of the present invention except for the use of the paraffin wax produced by the method of producing a paraffin wax of the present invention.

A paraffin wax produced by the method of producing a paraffin wax of the present invention allows consistent aqueous dispersion polymerization of TFE without lowering or fluctuating the rate of aqueous dispersion polymerization of TFE. The resulting PTFE dispersion and the PTFE fine powder obtained from the dispersion by coagulation have excellent and consistent physical properties.

For example, it is possible to lower the standard specific gravity (hereinafter referred to as SSG) of the resulting PTFE to 2.165 or below. The SSG is an indication of molecular weight, and a small SSG means a high molecular weight. The SSG tends to decrease with increase in the average molecular weight. Namely, it is possible to readily obtain PTFE having a small SSG and a high molecular weight.

Further, it is possible for the PTFE fine particles in the aqueous medium to have an average particle diameter of from about 0.1 to 0.4 $\mu$m. Furthermore, the resulting PTFE fine powder can be extruded at a pressure of from 9.8 MPa (100 kgf/cm$^2$) to 24.5 MPa (250 kgf/cm$^2$).

Now, the present invention will be illustrated by Examples below, but the present invention is by no means limited to them.

The standard specific gravity was measured in accordance with JIS K6935-2, and the extrusion pressure was measured as follows.

Measurement of Extrusion Pressure 100 g of a PTFE fine powder resin which had been left to stand at a room temperature for at least 2 hours was put in a glass bottle with a 900 cc capacity and 21.7 g of a lubricant, Isobar H (registered trade mark, Exxon) was added, followed by mixing for 3 minutes to give a PTFE mixture. The resulting PTFE mixture was allowed to stand in an incubator at 25° C. for 2 hours and paste-extruded into beads at a reduction ratio (the ratio of the inlet cross-sectional area to the outlet cross-sectional area of the die) of 100, an extrusion speed of 50.8 cm/min at 25° C. through an orifice with a diameter of 2.5 cm, a land length of 1.1 cm and an entrance angle of 30°. The pressure required for the extrusion was measured and defined as extrusion pressure.

EXAMPLE 1

A 100 l polymerization vessel was charged with 740 g of fresh Nisseki 125° paraffin wax (melting point 52° C.), 60 l of ultrapure water and 190 g of ammonium perfluorooctanoate. The vessel was degassed, purged with nitrogen, and then heated to 70° C. After the temperature became stable, TFE was supplied at a pressure of 1.86 MPa. 7.5 g of disuccinic acid peroxide dissolved in 1 l of water was added to initiate polymerization while the contents were stirred. Since the pressure in the polymerization vessel dropped as the polymerization proceeded due to consumption of TFE, TFE was supplied continuously to keep the pressure constant. Further, 30 minutes after the initiation of the polymerization, 300 g of ammonium perfluorooctanoate dissolved in 1 l of water was added. From 60 minutes after the initiation of the polymerization, the temperature in the polymerization vessel was elevated at a rate of 20° C. per hour. When 25 kg of TFE had been supplied since the initiation of the polymerization, the stirring and the supply of TFE were stopped, and then the polymerization vessel was purged of TFE with nitrogen, and the PTFE aqueous dispersion was obtained. The polymerization required 211 minutes. After cooling, solid paraffin wax and PTFE aqueous dispersion was separated. The dispersion was coagulated to separate the wet PTFE, and it was dried at 160° C. to obtain a PTFE fine powder. The PTFE had a standard specific gravity of 2.171 and required an extrusion pressure of 20.6 MPa.

From the supernatant obtained by separation of the wet PTFE from the aqueous dispersion, the used Nisseki 125° paraffin wax was recovered, and water and the recovered paraffin wax were put in a 100 l vessel in a ratio of 40 l to 20 kg. The temperature was elevated, and stirring was started when the paraffin wax melted completely. The temperature was further elevated, and stirring was continued for 2 hours while the internal temperature was kept at 80° C. Then, the paraffin wax was separated from the water, solidified and recovered as a recovered paraffin wax.

EXAMPLE 2

The same procedure as in Example 1 was followed to produce PTFE except that the recovered paraffin wax obtained in Example 1 was used instead of the fresh Nisseki 125° paraffin wax used for aqueous dispersion polymerization of TFE in Example 1. The polymerization required 127 minutes. The resulting PTFE had a standard specific gravity of 2.161 and required an extrusion pressure of 22.1 MPa.

EXAMPLE 3

The same procedure as in Example 1 was followed to produce PTFE except that the recovered paraffin wax obtained in Example 2 was used instead of the fresh Nisseki 125° paraffin wax used for aqueous dispersion polymerization of TFE in Example 1. The polymerization required 121 minutes. The emulsion was coagulated and dried in the same manner as in Example 2 to obtain a PTFE fine powder. The resulting PTFE had a standard specific gravity of 2.160 and required an extrusion pressure of 21.5 MPa.

EXAMPLE 4

The same procedure as in Example 1 was followed to produce PTFE except that a mixture of 520 g of the recovered paraffin wax obtained in Example 2 and 220 g of fresh Nisseki 125° paraffin wax was used instead of the fresh Nisseki 125° paraffin wax used for aqueous dispersion polymerization of TFE in Example 1. The polymerization required 141 minutes. The emulsion was coagulated and dried in the same manner as in Example 2 to obtain a PTFE fine powder. The resulting PTFE had a standard specific gravity of 2.162 and required an extrusion pressure of 21.2 MPa.

As described above, the present invention enables high speed aqueous dispersion polymerization of TFE with excellent polymerization behavior such as excellent dispersion stability and consistent production of PTFE having excellent physical properties. It is also possible to reduce waste discharge into the environment by recovering and reusing the paraffin wax.

The entire disclosure of Japanese Patent Application No. 2000-388855 filed on Dec. 21, 2000 including specification, claims and summary are incorporated herein by reference in its entirety.

What is claimed is:

1. A process of producing a paraffin wax for aqueous dispersion polymerization of tetrafluoroethylene, which comprises:

conducting at least one procedure of polymerizing tetrafluoroethylene monomer in an aqueous dispersion containing a polymerization initiator and an emulsifier in the presence of a paraffin wax and recovering the paraffin wax from the aqueous medium, thereby preparing a paraffin wax for reintroduction into an aqueous dispersion formulated for the polymerization of tetrafluoroethylene.

2. The method of producing a paraffin wax according to claim 1, wherein the paraffin wax after recovery from the aqueous dispersion is washed with water.

3. The method of producing a paraffin wax according to claim 2, wherein the washing with water is conducted by stirring the recovered paraffin wax in from 10 to 80 parts of water in relation to 100 parts of the paraffin wax at a temperature of from the melting point of the recovered paraffin wax to 95° C.

4. The method of producing a paraffin wax according to claim 2, wherein the washing with water is conducted by stirring the recovered paraffin wax in from 30 to 60 parts of water in relation to 100 parts of the paraffin wax at a temperature from 70 to 85° C.

5. The method of producing a paraffin wax according to claim 1, wherein the melting point of the paraffin wax is from 40 to 65° C.

6. The method of producing a paraffin wax according to claim 5, wherein the melting point of the paraffin wax is from 50 to 65° C.

7. A method of producing a polytetrafluoroethylene, which comprises:

conducting aqueous dispersion polymerization of tetrafluoroethylene in the presence of the recovered paraffin produced by the method of claim 1, in a dispersion containing a polymerization initiator and an emulsifier.

8. A method of producing a polytetrafluoroethylene, which comprises:

conducting aqueous dispersion polymerization of tetrafluoroethylene in the presence of a combination of a fresh paraffin wax and the recovered paraffin produced by the method of claim 1 in a ratio varying up to 80/20, in a dispersion containing a polymerization initiator and an emulsifier.

9. The method of producing a polytetrafluoroethylene according to claim 8, wherein the ratio of the fresh paraffin wax to the recovered paraffin wax is at most 40/60.

10. The method of producing a tetrafluoroethylene polymer according to claim 7, wherein the emulsifier is a perfluorocarbon anionic surfactant.

11. The method of producing a paraffin wax according to claim 1, wherein the amount of paraffin wax in a polymerization reaction ranges from 0.1 to 12% by weight, based on the amount of water in the reaction.

12. The method of producing a paraffin wax according to claim 1, wherein the polymerization reaction is a copolymerization reaction of tetrafluoroethylene with a monomer selected from the group consisting of hexafluoropropylene, perfluorobutene-1, perfluorohexene-1, perfluorononene-1, perfluoro(methyl vinyl ether), perfluoro(ethyl vinyl ether), perfluoro(propyl vinyl ether), perfluoro(heptyl vinyl ether), (perfluoromethyl)ethylene, (perfluorobutyl)ethylene and chlorotrifluoroethylene.

13. The method of producing a paraffin wax according to claim 1, wherein the polymerization reaction is conducted at a temperature within the range of 5 to 120° C. at a polymerization temperature of 0.5 to 4.0 MPa.

14. The method of producing a paraffin wax according to claim 13, wherein the polymerization reaction is conducted at a temperature within the range of 60 to 100° C. at a polymerization temperature of 1.0 to 2.5 MPa.

15. The method of producing a paraffin wax according to claim 1, wherein the polymerization reaction is conducted in the presence of a fluorocarbon anionic surfactant in an amount of 250 to 5000 ppm, based on the amount of water.

16. The method of producing a paraffin wax according to claim 1, wherein the PTFE aqueous dispersion has a solids content ranging from 20 to 45 wt %.

17. The method of producing a polytetrafluoroethylene according to claim 7, wherein the polytetrafluoroethylene product has a standard specific gravity of 2.165 or below.

18. The method of producing a polytetrafluoroethylene according to claim 8, wherein the polytetrafluoroethylene product has a standard specific gravity of 2.165 or below.

* * * * *